United States Patent
Mazzocchi et al.

(10) Patent No.: US 8,720,943 B1
(45) Date of Patent: May 13, 2014

(54) ACTIVE BOLSTER WITH ACTIVE VENT FOR LOAD MANAGEMENT

(71) Applicant: Ford Global Technologies, LLC, Dearborn, MI (US)

(72) Inventors: Nicholas A. Mazzocchi, Ann Arbor, MI (US); Timothy Scott, Benfleet (GB)

(73) Assignee: Ford Global Technologies, LLC, Dearborn, MI (US)

( * ) Notice: Subject to any disclaimer, the term of this patent is extended or adjusted under 35 U.S.C. 154(b) by 34 days.

(21) Appl. No.: 13/693,299

(22) Filed: Dec. 4, 2012

(51) Int. Cl.
*B60R 21/239* (2006.01)

(52) U.S. Cl.
USPC ............... 280/739; 280/730.1; 280/743.1

(58) Field of Classification Search
USPC ............ 280/730.1, 730.2, 732, 739, 743.1
See application file for complete search history.

(56) References Cited

U.S. PATENT DOCUMENTS

| | | | |
|---|---|---|---|
| 5,007,662 A | 4/1991 | Abramczyk et al. | |
| 5,310,215 A | 5/1994 | Wallner | |
| 5,524,925 A * | 6/1996 | Rose et al. | 280/739 |
| 5,725,244 A | 3/1998 | Cundill | |
| 6,017,057 A | 1/2000 | O'Docherty | |
| 6,032,978 A | 3/2000 | Spencer et al. | |
| 6,203,057 B1 | 3/2001 | Spencer et al. | |
| 6,213,497 B1 | 4/2001 | Spencer et al. | |
| 6,619,689 B2 * | 9/2003 | Spencer et al. | 280/730.1 |
| 6,758,493 B2 | 7/2004 | Conlee et al. | |
| 7,445,237 B2 | 11/2008 | Boyle, III et al. | |
| 7,469,926 B2 | 12/2008 | Lewis et al. | |
| 7,828,325 B2 | 11/2010 | Pittiglio et al. | |
| 8,146,943 B2 * | 4/2012 | Fukawatase et al. | 280/739 |
| 8,328,233 B2 * | 12/2012 | Kalisz | 280/739 |
| 8,454,054 B1 * | 6/2013 | Raines | 280/753 |
| 8,459,689 B2 * | 6/2013 | Roychoudhury | 280/730.1 |
| 8,544,879 B1 * | 10/2013 | Mazzocchi et al. | 280/730.1 |

(Continued)

FOREIGN PATENT DOCUMENTS

| | | |
|---|---|---|
| JP | 2002362639 A | 12/2002 |
| JP | 2007196700 A | 8/2007 |
| WO | 2008039109 A1 | 4/2008 |

OTHER PUBLICATIONS

Raj S. Roychoudhury et al., Blow-Molded Plastic Active Knee Bolsters, SAE Technical Paper Series 2004-01-0844, Mar. 8-11, 2004, pp. 1-9.

(Continued)

*Primary Examiner* — Paul N Dickson
*Assistant Examiner* — Barry Gooden, Jr.
(74) *Attorney, Agent, or Firm* — Vichit Chea; MacMillan, Sobanski & Todd, LLC (57) ABSTRACT

An active bolster has a plastic-molded, expandable front wall and a plastic-molded back wall joined around a substantially sealed perimeter with the front wall to form an inflatable bladder. The back wall includes at least one active vent and at least one substantially circumferential pleated baffle. An inflator couples an inflation gas into the inflatable bladder in response to a crash event of the vehicle. The active vent comprises a window opening in the back wall and an integrally-molded flap juxtaposed to the window opening. The flap has an undeflected position corresponding to a first flow coefficient and a deflected position corresponding to a second, nonzero flow coefficient that is less than the first flow coefficient. The flap moves from the undeflected position to the deflected position when a pressure in the inflatable bladder resulting from a passenger impact is greater than a predetermined pressure.

11 Claims, 6 Drawing Sheets

(56) References Cited

U.S. PATENT DOCUMENTS

| | | |
|---|---|---|
| 2001/0054811 A1* | 12/2001 | Spencer et al. ............ 280/730.1 |
| 2002/0125691 A1* | 9/2002 | Conlee et al. .............. 280/730.1 |
| 2008/0007038 A1 | 1/2008 | Fischer et al. |
| 2008/0164681 A1 | 7/2008 | Nuthalapati |
| 2009/0152848 A1 | 6/2009 | Sadr et al. |
| 2009/0152849 A1 | 6/2009 | Saraf et al. |
| 2009/0284041 A1 | 11/2009 | Hall et al. |
| 2011/0133435 A1* | 6/2011 | Sadr et al. .................. 280/730.1 |
| 2012/0112439 A1 | 5/2012 | Roychoudhury |
| 2012/0248742 A1* | 10/2012 | Kalisz ........................ 280/728.2 |
| 2013/0341893 A1* | 12/2013 | Sadr et al. .................. 280/730.1 |

OTHER PUBLICATIONS

Bijoy K. Saraf, et al., Active Bolster for Side Impact Protection, SAE Technical Paper Series 2008-01-0191, Apr. 14-17, 2008, pp. 1-11.

* cited by examiner

ACTIVE BOLSTER WITH ACTIVE VENT FOR LOAD MANAGEMENT

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to active bolsters for occupant crash protection in automotive vehicles, and, more specifically, to an active bolster with an inflatable bladder formed by plastic wall panels that is vented to manage a deflation rate during impact according to the energy at which a passenger impacts the bolster.

An active bolster is a vehicle occupant protection device with a gas-inflatable bladder to absorb impacts and reduce trauma to occupants during a crash. As opposed to deployable air bag cushions made of various fabrics that emerge from behind various openings upon inflation, active bolsters use the interior trim surface itself to expand at the beginning of a crash event for absorbing the impact and dissipating energy through the action of an inflation gas. U.S. Pat. No. 8,205,909, issued Jun. 26, 2012, incorporated herein by reference, discloses an active knee bolster integrated into a glove box door that is light weight and visually attractive. Pending U.S. patent application publication no. 2012/0267878A1, also incorporated herein by reference, discloses a typical structure wherein an active bolster includes a front wall or panel that faces a vehicle occupant attached to a base wall or panel along a sealed periphery. One or both of the walls is deformable in order to provide an inflatable bladder. For example, the base wall may have a pleated (i.e., accordion-like) region that straightens out during inflation. The walls are initially spaced apart by a small amount when in their pre-deployment, non-inflated condition. This allows ingress of the inflation gas in a manner that achieves an even inflation across the panel.

The front and base walls of a typical bladder for an active bolster are comprised of molded thermoplastics such as polyethylene, polyolefin, or PVC. They are typically injection molded but can also be blow molded. When formed separately, the front and base walls must be hermetically joined around their periphery in order to form the inflatable bladder. The joint must be strong to resist separation that could result from the high pressures during inflation. The peripheral seal is formed by hot welding, for example.

It is known that in order to optimize the dissipation of energy when an occupant contacts an air bag, inflation gas should be vented to allow a controlled collapse of the airbag that safely decelerates the impacting occupant. Some conventional airbags have utilized vents that only open in response to pressure within the airbag reaching a predetermined threshold. In the case of an active bolster employing a bladder formed by molded plastic panels, it is desirable to vent the inflatable bladder at all times to maintain it at substantially atmospheric pressure during non-crash conditions. Otherwise, noticeable deformation of the interior trim component incorporating the active bolster may occur during temperature extremes since the panel materials are relatively flexible. Furthermore, it is desirable to avoid the use of costly, complicated vent valves of the types known in the prior art.

U.S. patent publication 2012/0248742A1, which is incorporated herein by reference, discloses an active vent for an active bolster wherein the vent has a low flow rate at low pressures and a higher flow rate at higher pressures across the vent. The reduced flow rate of the vent during initial stages of inflation permits the use of a smaller (less costly) inflator, while the higher vent flow rate at higher pressures helps ensure the integrity of the peripheral weld by limiting the pressure rise and avoiding large tearing forces that could cause the seal to fail.

It has been found that an active vent that assumes a higher flow coefficient in response to a higher pressure may lead to insufficient energy management in some circumstances, such as a relatively hard impact (e.g., a relatively heavy passenger moving at a moderate velocity or a smaller passenger moving at a relatively high velocity). In this particular situation, an undesirably fast deflation of the bladder may result in insufficient initial deceleration of the impacting body which may then be followed by a bottoming out of the bolster (and a sudden deceleration of the impacting body) once the bolster has completely collapsed. The present invention overcomes these difficulties while providing an active vent structure with high reliability that can be manufactured using simple, low cost methods.

SUMMARY OF THE INVENTION

In one aspect of the invention, an active bolster mounts at an interior trim surface of a passenger compartment in an automotive vehicle. A plastic-molded, expandable front wall is provided for deploying toward a passenger in the passenger compartment. A plastic-molded back wall is joined around a substantially sealed perimeter with the front wall to form an inflatable bladder, wherein the back wall includes at least one active vent and at least one substantially circumferential pleated baffle. An inflator couples an inflation gas into the inflatable bladder in response to a crash event of the vehicle. The active vent comprises a window opening in the back wall and an integrally-molded flap juxtaposed to the window opening. The flap has an undeflected position corresponding to a first flow coefficient and a deflected position corresponding to a second, nonzero flow coefficient that is less than the first flow coefficient. The flap moves from the undeflected position to the deflected position when a pressure in the inflatable bladder resulting from a passenger impact is greater than a predetermined pressure.

DETAILED DESCRIPTION OF PREFERRED EMBODIMENTS

Figure 1:
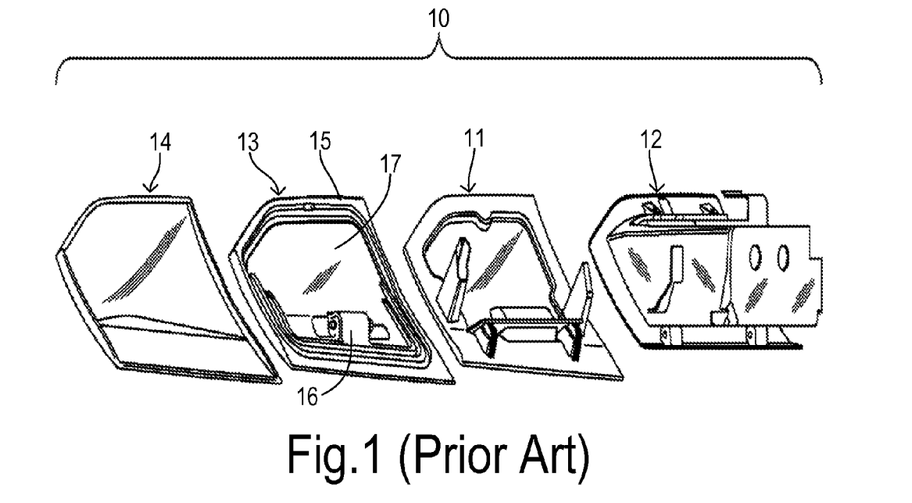
FIG. 1 is an outward-looking, exploded perspective view of an active knee bolster glove box door system of a type to which the present invention can be applied.

Referring now to FIG. 1, a prior art active knee bolster system 10 has a base panel component 11 which forms the foundation for the bolster. Base 11 may be either attached to the vehicle by hinging from a storage cavity or glove box 12 as shown in FIG. 1, or mounted to another structure such as an instrument panel support located below a steering column, for example. Such locations are accessible to the knees of an individual riding in a corresponding seating position within a vehicle.

Base 11 acts as a reaction surface for supporting an inflatable bladder formed by a back wall 13 and a front wall 14 that are joined around their periphery 15. Walls 13 and 14 are preferably comprised of molded plastics (such as thermoplastic polyolefin (TPO)) and are joined by plastic hot welding, such as hot plate or vibration welding, to form a peripheral seal around a central region 17 for forming an inflatable bladder. An inflation gas source 16 is electronically controlled for activating during a crash to release gas to inflate the bolster. Front wall 14 may comprise the Class A interior trim surface such as the outside of the glove box door, or an additional skin or cover (not shown) can be applied to its outer surface.

Figure 2:
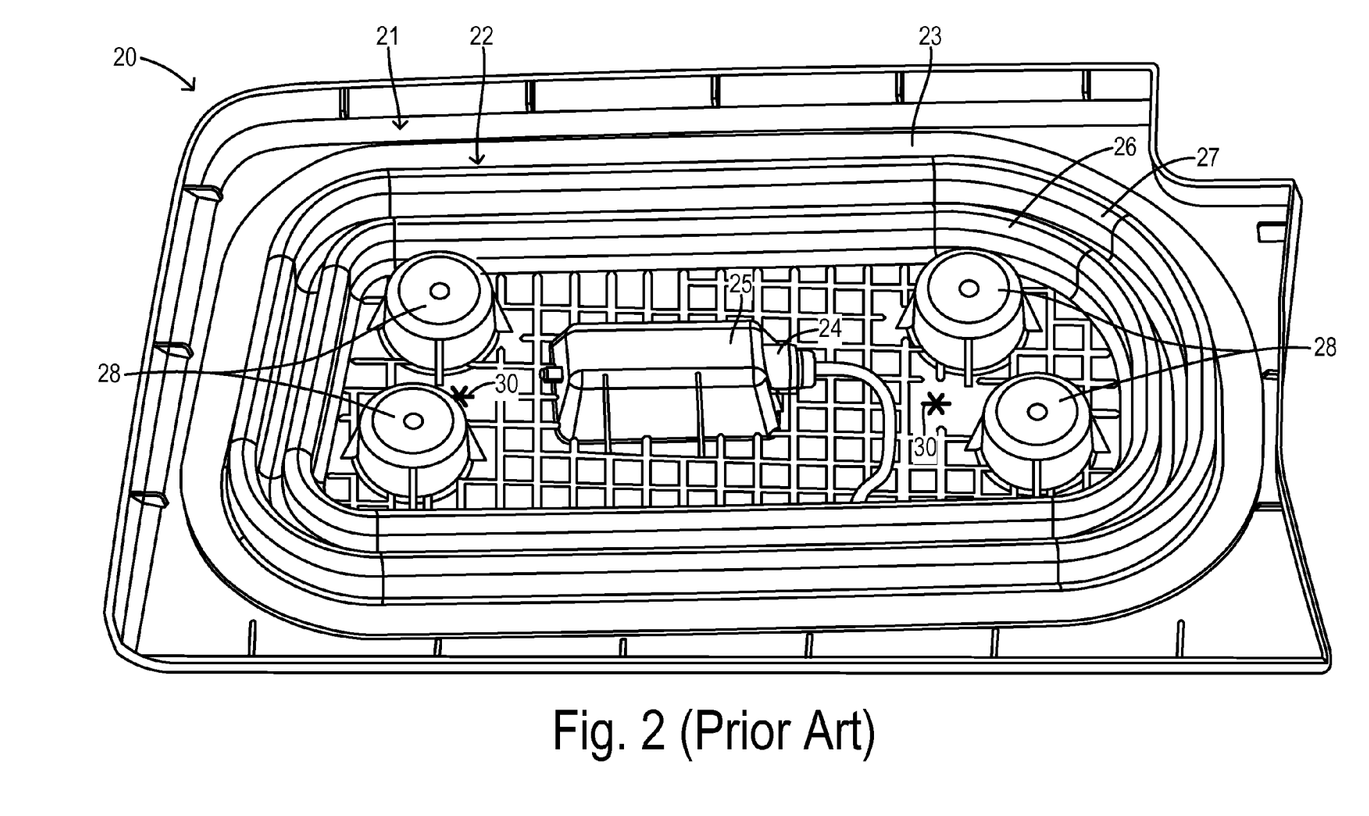
FIG. 2 is a rear perspective view of an inflatable bladder assembly of an active bolster.

FIG. 2 is a rear view of one type of known inflatable bladder 20 for an active bolster. A plastic-molded front wall 21 overlies a plastic-molded, expandable back wall 22. Walls 21 and 22 are joined around a closed perimeter region 23 to form an inflatable bladder having an open central volume between walls 21 and 22 to receive an inflation gas from an inflator 24 mounted in a recess 25 of back wall 22 during a crash event. Back wall 22 includes a plurality of pleats, such as 26 and 27, to accommodate the expansion of back wall 22 during inflation. A plurality of bosses 28 are used to mount back wall 22 to a reaction surface. Vent holes 30 comprised of an asterisk-shaped pattern cut through inner wall 22 have previously been used for venting the central volume prior to and during inflation.

Figure 3:
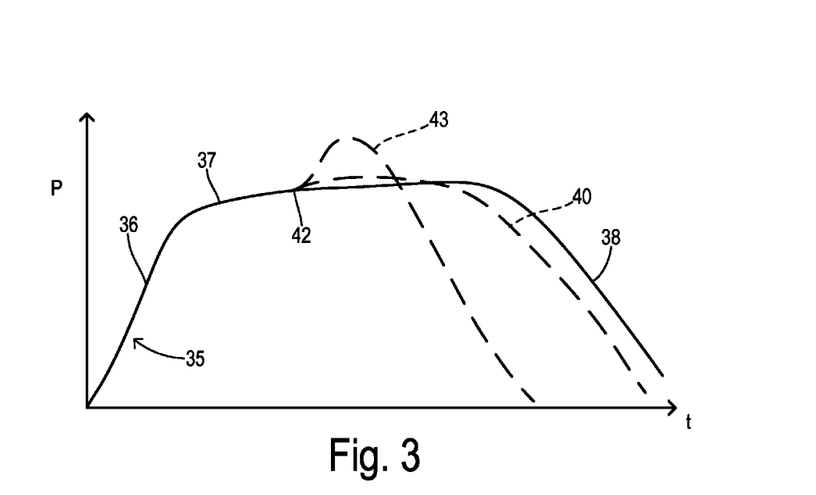
FIG. 3 is a comparison plot showing bladder pressure during various impact events.

FIG. 3 shows a plot 35 showing changing pressure over time during an inflation event in which the inflator is activated at a time t=0. During an initial stage of inflation along a segment 36, pressure rises within the inflatable bladder which begins to expand. As bladder expansion continues and the gas output from the inflator begins to tail off, curve 35 begins to level off at segment 37. As the supply of inflation gas runs out, normal venting of the gas from inside the bladder without any outside impact against the bolster results in a final pressure drop off shown at segment 38. In the event of an impact occurring at a point 42, the bladder pressure may follow a different trajectory as shown at segment 40. In a relatively low energy impact (e.g., a small passenger or a slow impact), pressure in the bladder may rise only slightly during the initial impact along segment 40. This may cause a slight increase in the subsequent flow rate of vented gas so that a final pressure drop off trajectory of segment 40 occurs sooner in time than it would with no impacting load as shown along segment 38, but the trajectory lasts long enough to decelerate the impact load.

A high-energy impact trajectory 43 corresponds to pressure changes in a prior art bolster wherein either a fixed capacity vent or an active vent that increasingly opens at higher pressures respond to the higher pressures by deflating the bladder more quickly. A larger impact energy causes a greater immediate increase in bladder pressure followed by a much faster and steeper loss of pressure. Trajectory 43 corresponds to a non-optimal management of the impact energy since the rapid loss of inflation gas through the vent means that the bolster does not adequately decelerate the impacting passenger. It is desirable for both low energy and high energy impacts to follow a trajectory similar to trajectory 40. This is achieved in the present invention by providing an active vent having a first flow coefficient during initial inflation and having a lesser (i.e., smaller) flow coefficient during a heavy impact against the bladder that increases pressure above a predetermined pressure.

Figure 4:
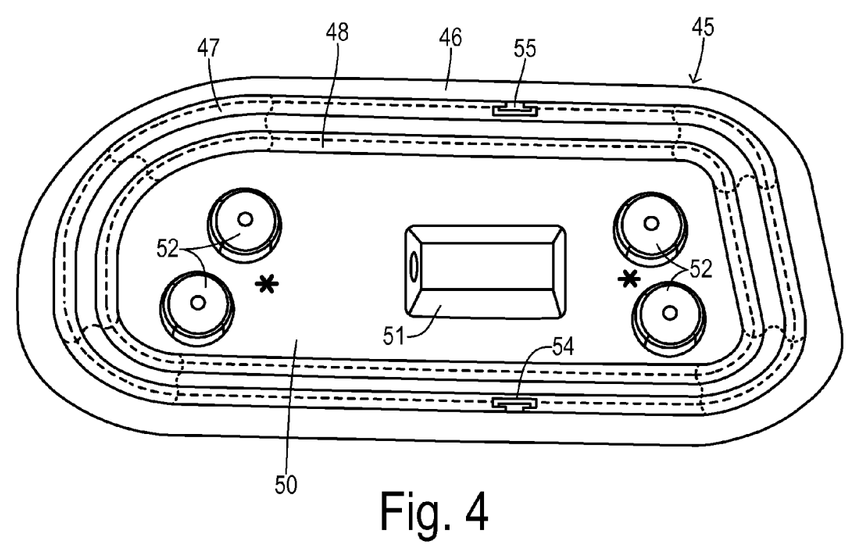
FIG. 4 is a rear perspective view of a back wall having active vents configured according to the present invention.

In one embodiment of the invention shown in FIG. 4, a back wall 45 has a peripheral welding flange 46 disposed around a plurality of pleated baffles 47 and 48. A central region 50 of back wall 45 includes a recess 51 for an inflator and bosses 52 for mounting to a reaction surface (not shown). Baffle 47 receives active vents 54 and 55 (although a different number of vents or a vent placement anywhere on back wall 45 can be employed).

Figure 5:
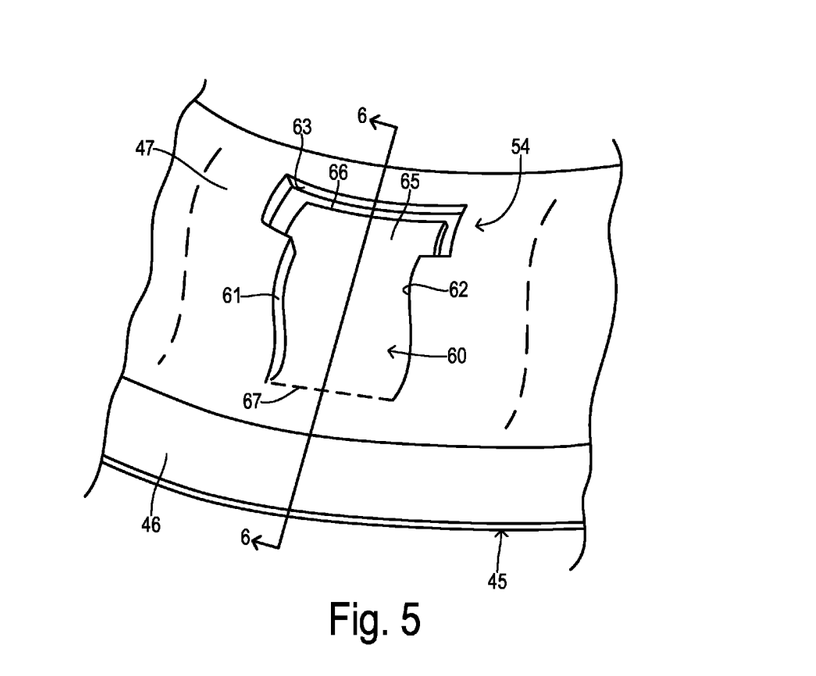
FIGS. 5 and 6 show an active vent of FIG. 4 at an undeflected position in perspective and cross-sectional views, respectively.
Figure 6:
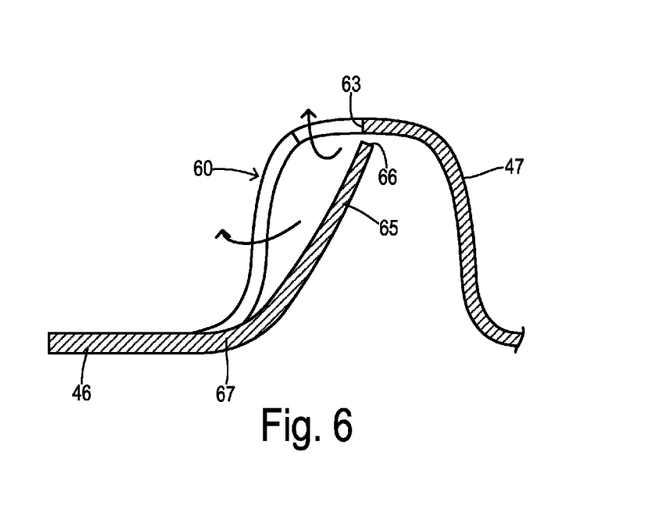

FIGS. 5 and 6 show active vent 54 in greater detail. A T-shaped window 60 is formed as an aperture within pleated baffle 47 having a base section between sidewalls 61 and 62 and a slot section along a wider top edge 63. A deflectable flap 65 is integrally molded with back wall 45 and is juxtaposed with window 60. Upper edge 63 is aligned with the peak of pleated baffle 47 and is sized to allow an upper edge 66 of flap 65 to swing through the upper section of window 60. Flap 65 has a lower edge 67 between window edges 61 and 62 that acts as a living hinge. FIGS. 5 and 6 show flap 65 in an undeflected position wherein inflation gas can pass through both the lower and upper sections of window 60.

Figure 7:
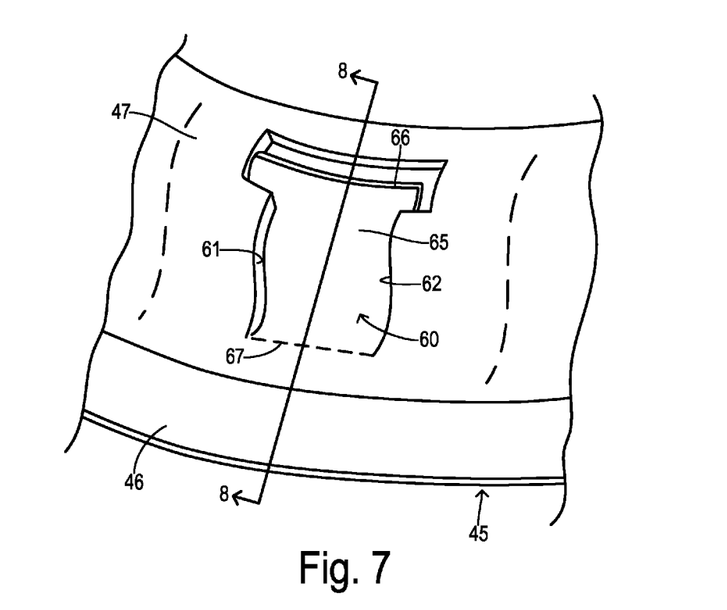
FIGS. 7 and 8 show an active vent of FIG. 4 at a deflected position in perspective and cross-sectional views, respectively.
Figure 8:
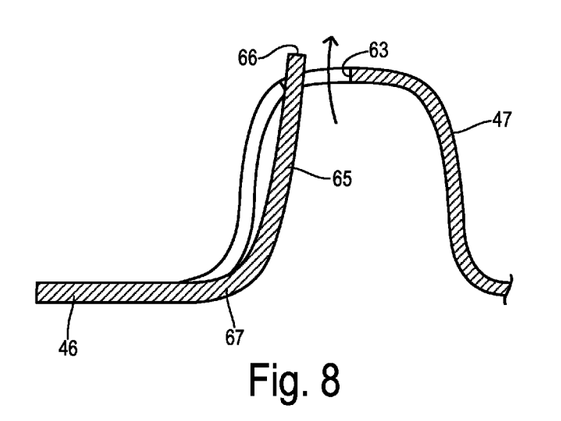

FIGS. 7 and 8 show flap 65 moved into a deflected position as a result of a pressure on the inside of the inflatable bladder being greater than a predetermined pressure as a consequence of a passenger impact against the bladder. When the predetermined pressure (i.e., a pressure difference between the inner and outer sides of flap 65 sufficient to make it pivot with respect to living hinge 67) is present, flap 65 substantially closes off the lower section of window 60 so that only the upper section of window 60 is available for venting gas out from the inflatable bladder. Since a reduced area is available for passing the flow, the resulting flow coefficient in the deflected position is lower than the flow coefficient during the initial stages of inflation. However, a non-zero flow coefficient is always maintained since the upper portion of window 60 remains open. Since a flow coefficient greater than or equal to the second coefficient is always provided, it is possible to always ensure a minimal level of protection against weld failure and a minimal amount of energy absorption in response to a corresponding minimal level of deflation. More specifically, a more favorable energy management is obtained in impacts with various low or high energies since a more consistent deflation rate is obtained across a broad range of impact energies.

Placing at least one active vent in the pleated region adjacent to the peripheral welding flange has various advantages. In particular, a designer can model the expansion forces that are applied to the inflatable bladder walls and the peripheral weld (i.e., without the vents) in order to identify local regions having a highest probability of weld failure. Then the designer can place an active vent in close proximity to that location on the welded perimeter so that the forces will be locally decreased and the chances of a weld failure are reduced. Furthermore, the baffle location of the present embodiment is adapted to easy manufacture with known molding equipment and methods.

Figure 9:
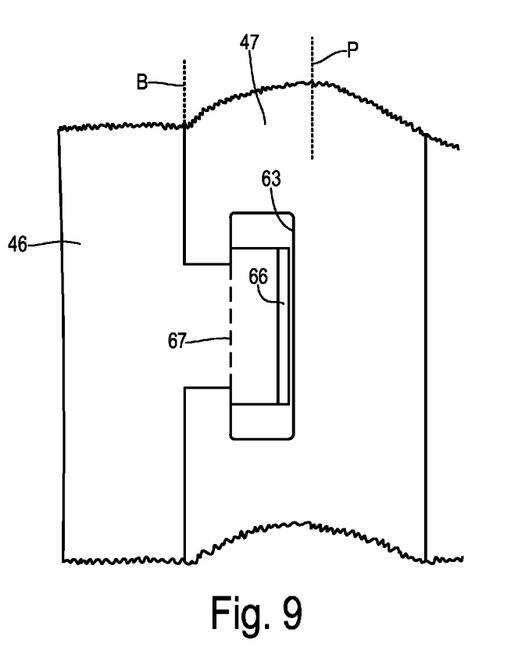
FIG. 9 is a top, plan view of the active vent of FIG. 4.

As shown in FIG. 9, pleated baffle 47 has a peak P and a bottom B. Edge 63 of window 60 and edge 66 of flap 65 are substantially aligned with peak P while living hinge 67 is substantially aligned with bottom B. Besides being convenient for purposes of manufacturing, this orientation of the window and flap is compatible with the unfolding of pleated baffle 47 during bladder inflation.

Figure 10:
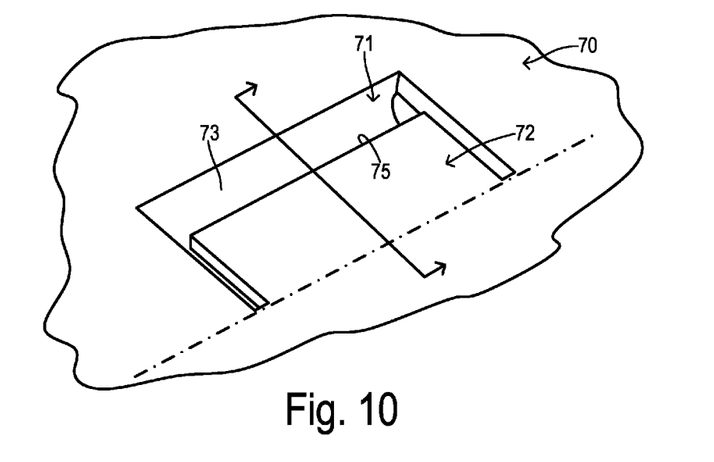
FIGS. 10 and 11 are perspective and cross-sectional views, respectively, of an alternative embodiment of an active vent of the present invention.
Figure 11:
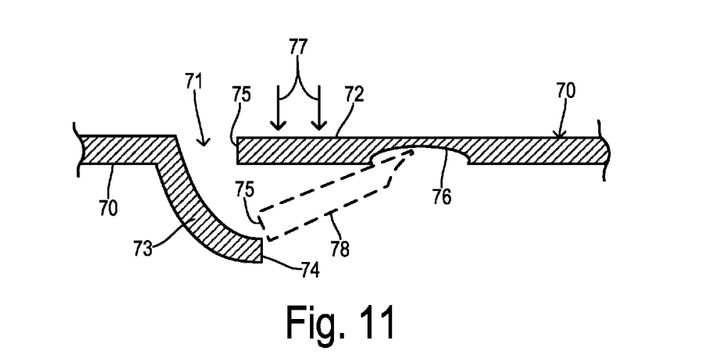

FIGS. 10 and 11 illustrate an alternative embodiment wherein a back wall 70 includes a window 71 and a deflectable flap 72. Window 71 includes a ramp 73 extending outwardly from the interior side of the inflatable bladder to an end 74 which is disposed over an end 75 of flap 72. Flap 72 may have a thinned edge 76 to form a living hinge, whereby pressure above a predetermined pressure during a high energy passenger impact as shown at 77 deflects flap 72 about living hinge 76 into a deflected position 78 shown as dashed lines. As edge 75 approaches edge 74, the flow coefficient of the active vent is reduced. A minimal flow coefficient is maintained by openings at the lateral sides of ramp 73. Thus, the active vent performs the same functions as the previously described embodiment.

What is claimed is:

1. An active bolster for mounting at an interior trim surface of a passenger compartment in an automotive vehicle, comprising:
    a plastic-molded, expandable front wall for deploying toward a passenger in the passenger compartment;
    a plastic-molded back wall joined around a substantially sealed perimeter with the front wall to form an inflatable bladder, wherein the back wall includes at least one active vent and at least one substantially circumferential pleated baffle; and
    an inflator for providing an inflation gas to the inflatable bladder in response to a crash event of the vehicle;
    wherein the at least one active vent comprises a window opening in the back wall and an integrally-molded flap juxtaposed to the window opening, wherein the flap has an undeflected position corresponding to a first flow coefficient and a deflected position corresponding to a second, nonzero flow coefficient that is less than the first flow coefficient, and wherein the flap moves from the undeflected position to the deflected position when a pressure in the inflatable bladder resulting from a passenger impact is greater than a predetermined pressure.

2. The active bolster of claim 1 wherein the window opening has a first section closable by the flap and a second section that remains unblocked when the flap is in the deflected position so that the at least one active vent always provides a flow coefficient greater than or equal to the second flow coefficient.

3. The active bolster of claim 1 wherein the flap includes a living hinge section along an edge joining the flap to the back wall.

4. The active bolster of claim 1 wherein the back wall includes a plurality of the at least one active vent.

5. The active bolster of claim 1 wherein the window opening includes a ramp with a distal end for receiving the flap in the deflected position.

6. The active bolster of claim 1 wherein the inner and the outer walls are comprised of thermoplastic polyolefin, wherein the inner and the outer walls are joined by a hot weld along the closed perimeter, and wherein the active vent is placed in proximity to a location on the welded perimeter having a localized highest probability of weld failure when the inflatable bladder is inflated.

7. The active bolster of claim 1 wherein the at least one active vent is located on the baffle.

8. The active bolster of claim 7 wherein the flap includes a living hinge section along an edge joining the flap to the back wall, and wherein the living hinge is aligned with a bottom edge of the baffle.

9. The active bolster of claim 1 wherein the window opening is T-shaped and wherein the flap extends from the back wall at a base of the T-shaped window opening.

10. The active bolster of claim 9 wherein the at least one active vent is located on the baffle, wherein the flap includes a living hinge section along an edge joining the flap to the back wall, wherein the living hinge is aligned with a bottom edge of the baffle, and wherein the T-shaped window has an upper edge aligned with a peak of the baffle.

11. A method of actively venting an active bolster in a vehicle, wherein the bolster includes a bladder having a front wall and a back wall defining an internal cavity for receiving inflation gas from a gas source during a crash event of the vehicle, the method comprising the steps of:
    configuring a vent in the bladder to provide a first flow coefficient when a pressure difference across the vent is below a first predetermined value and a second flow coefficient when the pressure difference is greater than or equal to a second predetermined value, wherein the second flow coefficient is nonzero and less than the first flow coefficient, and wherein the second predetermined value corresponds to a heavy impact occurring against the bladder when inflated;
    initiating a delivery of the inflation gas into the bladder in response to the crash event, wherein the inflation gas flows out of the vent according to the first flow coefficient during an initial delivery of the inflation gas to inflate the bladder; and
    the vent automatically responding to an impact against the bladder by venting the inflation gas at the second flow coefficient when the pressure difference rises to the second predetermined value.

* * * * *